United States Patent [19]

Gille et al.

[11] 4,314,186
[45] Feb. 2, 1982

[54] WIPER MOTOR CIRCUIT ARRANGEMENT

[75] Inventors: Gunther Gille, Sersheim; Horst Goertler, Sachsenheim; Hans Prohaska; Horst Rachner, both of Bietigheim-Bissingen, all of Fed. Rep. of Germany

[73] Assignee: ITT Industries, Inc., New York, N.Y.

[21] Appl. No.: 100,948

[22] Filed: Dec. 6, 1979

[30] Foreign Application Priority Data

Dec. 6, 1978 [DE] Fed. Rep. of Germany ....... 2852676

[51] Int. Cl.³ .......................................... H02K 23/68
[52] U.S. Cl. .............................. 318/434; 318/DIG. 2; 361/51; 361/23
[58] Field of Search ................. 318/DIG. 2, 434, 312, 318/328, 461, 464; 361/23, 28, 51

[56] References Cited

U.S. PATENT DOCUMENTS

| 3,389,321 | 6/1968 | Miller et al. | 318/461 |
| 3,536,977 | 10/1970 | Porter | 318/461 |
| 3,906,322 | 9/1975 | Hirpo | 318/464 |
| 3,931,557 | 1/1976 | Osborn | 361/23 |
| 4,145,728 | 3/1979 | Royer | 361/23 |
| 4,163,999 | 8/1979 | Eaton et al. | 361/23 |

Primary Examiner—J. D. Miller
Assistant Examiner—John W. Redman
Attorney, Agent, or Firm—James B. Raden; William J. Michals

[57] ABSTRACT

A circuit arrangement for windshield wiper motor protection including circuits for pulsing the motor with a variable pulse interval pattern. The pulse interval is generated by circuits which are responsive to motor speed from a comparison with a reference. The motor is automatically deenergized when it is overloaded or stalled.

2 Claims, 9 Drawing Figures

WIPER MOTOR CIRCUIT ARRANGEMENT

BACKGROUND OF THE INVENTION

1. Field of the Invention

The invention relates to circuits for controlling wiper motors.

2. Description of the Prior Art

It often occurs that in automotive wiper installations the output torque of the wiper motor is insufficient to move the wiper blade over a dry pane. The motor then blocks and is subject to damage from overheating. In order to protect such a motor against destruction, thermo-switches are connected into the operating circuit which periodically interrupt the circuit. The motor is then energized in a pulse mode, whereby the ratio of deenergized interval to pulse duration is large so that the motor is not overheated. The switching operation of such thermo-switches is affected by the outside temperature, so that under certain circumstances it is switched off prematurely. Moreover, it is difficult to realize a sufficient aforementioned ratio.

SUMMARY OF THE INVENTION

The invention addresses the problem of providing a circuit arrangement for a wiper motor which, in case of overload, reliably protects said motor against destruction.

This is achieved by means of a circuit set forth in the claims. From the comparison of the time interval of the speed-dependent pulses with a suitably selected reference signal the operating condition of the wiper can reliably be recognized.

Accordingly, a circuit arrangement is developed in a way that a switching signal is only released when the motor is blocked. Under certain circumstances, the wiper blade obviously comes to a standstill somewhere in the wiping area. Therefore, a better solution results if a switching signal is released while the wiper motor is still rotating very slowly. In connection with another feature it is then possible to energize the still-slowly-rotating wiper motor via the limit switch until the wiper blade is parked in its end position.

Embodiments are preferred in which a plurality of pulses is released during each wiping cycle, the switching-off process then being very quickly initiated, since then the reference signal can be correspondingly smaller. Especially advantageous is an embodiment in which, at constant speed, the time interval of the pulses varies with the position of the motor and thereby with the position of the wiper blades. This version is based on the knowledge that the danger of a blocking of the motor is especially great in particular wiping angle areas. For instance it was determined that, starting from the parking position in which the wiper blades are parked in parallel to the lower rim of the pane, the speed decreases in a wiping angle area between approximately 40 to 70 degrees. Accordingly, in this angular area the time interval of the pulses must be larger than in the remaining angular areas, i.e. 0 to 40 degrees or 70 to 360 degrees. The invention provides that, when the reference signal is accordingly adjusted, in the angular area between 40 and 70 degrees a switching signal is released, when the motor is overloaded but not stalled, but in the remaining area only at standstill of the motor.

In principle it is possible to switch off the wiper motor when the switching signal appears, whereby the motor can only be switched on anew upon actuation of the wiper switch. But a version is preferred in which the switching element is periodically switched on and off so that the wiper installation automatically takes over its normal function when the trouble is eliminated.

In order to protect the wiper motor reliably, the switching-off time must be relatively large, however this results in the disadvantage of a short time for returning to readiness for service. This shortcoming can be eliminated if an additional temperature-dependent switching stage is provided. Such a switching stage could be energized via a temperature-dependent component, but the voltage drop is preferably tapped off directly from the armature winding of the motor. Additional temperature-dependent resistors which would have to be integrated into the motor are then no longer necessary.

Because the wiper motor is normally either tight (overloaded but not stalled) or blocked, when the pane is dry, the wiper installation can be set to operation again by the measures according to the invention.

Other advantageous developments of the specific circuit arrangement are presented, including special versions of the wiper motor provided for use with the invention circuit arrangement. The advantages of these developments of the invention can be seen from the following description of several embodiments.

BRIEF DESCRIPTIONS OF THE DRAWINGS

DETAILED DESCRIPTION OF THE DRAWINGS

Figure 1:
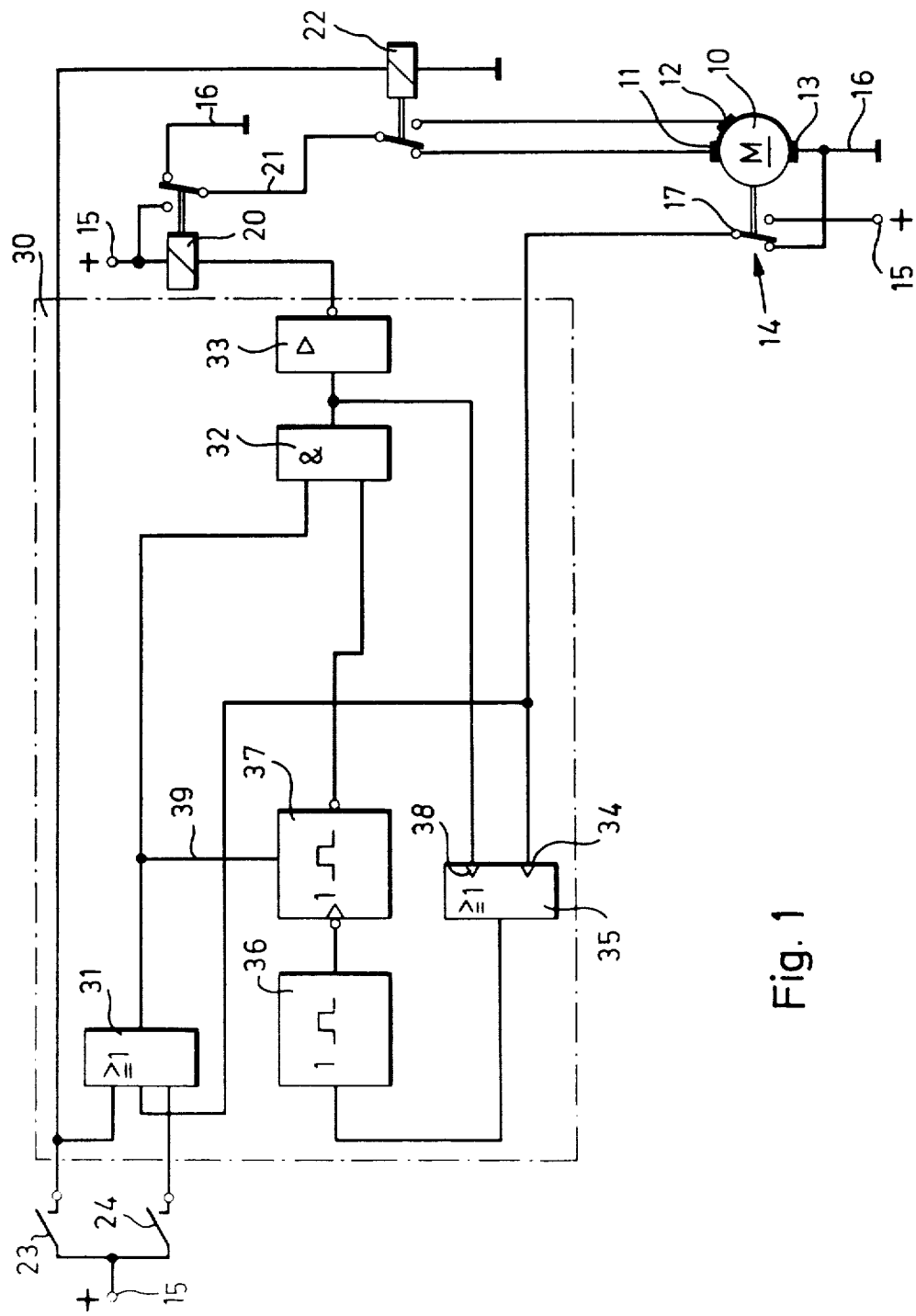
FIG. 1 is a schematic circuit diagram of a version in which a switching signal is released, when the motor is blocked.

In the drawings the conventional wiper motor, has three brushes 11, 12, 13 and is designated by 10. The motor 10 runs more slowly when it is energized via the brush 11 and faster when energized via the brush 12. A limit switch 14 alternatively switches between positive potential from the terminal 15 and (in the parking position) ground potential 16 to an output 17, and is mechanically actuated by the motor.

The motor circuit is controlled via a switching element 20 which is implemented as a changeover relay and which alternatively switches positive potential from the positive terminal 15 or ground potential 16 onto the motor supply lead 21. A speed changeover relay 22 alternatively connects the motor supply lead 21 with one of the brushes 11 or 12. The switching element 20 and the speed changeover relay 22 are combined in a unit with the wiper motor 10.

The actual control circuit 30 which is developed as an integrated circuit, or can be part of a microcomputer, has an OR-gate 31, whose inputs are controllable from the manual operating switch 23 for high speed, by the operating switch 24 for low speed or by the limit switch 14. The output of the OR-gate 31 is connected to one input of an AND-gate 32 which energizes an inverting amplifier 33 which controls the switching element 20.

If at first it is assumed that positive potential is conducted to the other input of the AND-gate 32, conventional wiper operation is possible with the components thus far described. If one of the operating switches 23 or 24 is actuated, the AND-gate 32 is connected through, so that ground potential appears on the output of the inverting amplifier 33. The switching element 20 then responds and closes the motor circuit. The motor 10 rotates, at a speed which depends on whether the wiper operation is initiated via the operating switch 23 directly controlling the speed changeover relay 22 or via the operating switch 24. After a short time the limit switch 14 switches positive potential on an input of the OR-gate 31 so that, when the operating switches are switched off, the wiper motor is subsequently switched off and dynamically braked when the wiper reaches its parking (end) position.

Figure 2:
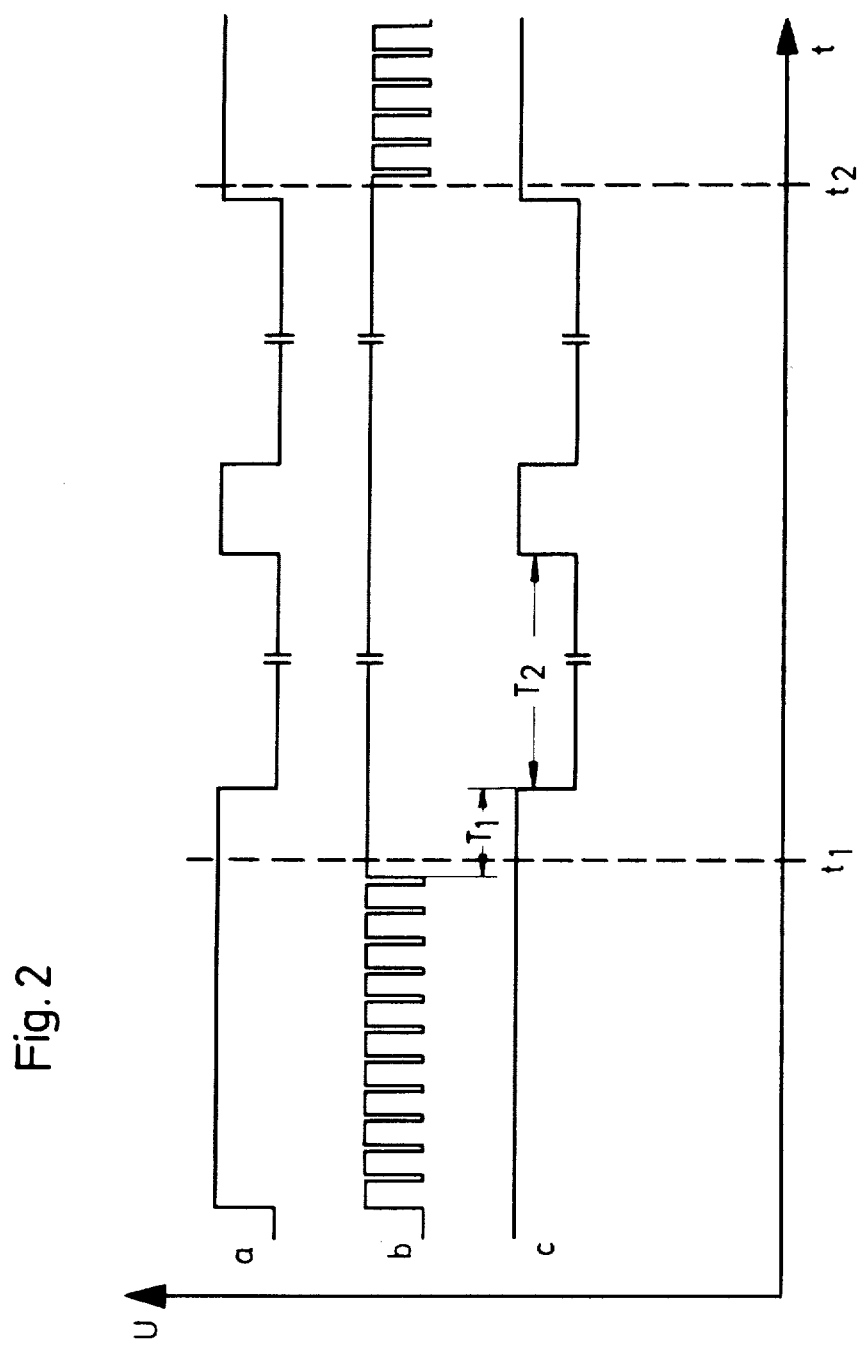
FIG. 2 shows voltage-time-diagrams in various connection points.

At the output 17 of the limit switch 14 a pulse sequence may be tapped off which is shown in FIG. 2b. These speed-dependent pulses are conducted to a dynamic input 34 of a further OR-gate 35. The output of said OR-gate 35 is connected to the input of a monoflop 36 which may be retriggered. An inverting input of a monostable multivibrator 37 is triggered by this monoflop 36 on the negative slope. The inverted output signal of said monostable multivibrator 37 is conducted to the other dynamic input 38 of the OR-gate 35 via the second input of the AND-gate 32. By the dynamic feedback of the output signal of the monostable multivibrator 37 from the monoflop 36 via the OR-gate 35 an astable multivibrator is formed, whereby the switching element 20 can be controlled during pulse operation when either operating switch 23 or 24 is switched on.

At the inverting output of the monostable multivibrator 37 positive potential occurs in the rest position. Because of the dynamic input of the OR-gate 38 said output of the OR-gate 35 is applied to ground potential. If the wiper motor 10 starts and the limit switch 14 is thereby changed over, a first pulse is immediately conducted to an input 34 of the OR-gate 35. Thereby the monoflop 36 is retriggered. Said monoflop 36 has a cycle time of, for instance 15 seconds, however this time is longer than the time interval for a wiping cycle, when the wiper is overloaded. When the wiper operation is undisturbed, pulses are continuously conducted to the monoflop 36 and it is thereby triggered anew each time, so that positive potential is continuously available at the output. This does not affect the switching condition of the following monostable multivibrator 37. When the wiper motor stops, however, no further speed-dependent pulse is conducted to the monoflop 36 within its cycle time. The cycle time expires and the output of the monoflop assumes ground potential. This negative-going voltage jump is inverted at the input of the following monostable multivibrator 37, so that this multivibrator is set.

The AND-gate 32 is blocked via the inverting output of the multivibrator 37 and thus positive potential is also applied to the other terminal of the switching element 20 via the inverting amplifier 33, said switching element 20 then releasing and interrupting the motor circuit. The monostable multivibrator 37 has a cycle time of about one minute. After expiration of this time the switching condition at the output of said monostable multivibrator 37 changes and the monoflop 36 is triggered again via the AND-gate 32 and the dynamic input 38 of the OR-gate 35. After expiration of the cycle time of said monoflop 36 the multivibrator 37 is again set and this operation is continuously repeated as long as one of the operating switches 23 or 24 is actuated or the limit switch 14 switches through the positive potential.

The following comments relate to operating conditions. The pulse operation of the circuit is effected by the dynamic feedback of the multivibrator output signal to the monoflop, the latter being responsive to retriggering. But this feedback is only extant if one of the operating switches 23 or 24 is actuated or if the wiper motor has not yet reached the position corresponding to the wiper blade parking position. If the wiper motor is in other than the parking position and the operating switches are switched off, this pulse operation is maintained in order to permit the wipers to automatically return to their parking position, when the cause of stalling or overload is eliminated.

If the operating switches 23 and 24 are switched off and the wiper motor already occupies its parking position, the feedback is prevented, so that an unnecessary pulse operation of the switching element 20 is avoided. If the wiper motor is blocked in the parking position, no speed-dependent pulses can be released. Nevertheless a trigger pulse for the monoflop 36 is released via the OR-gate 31, the AND-gate 32 and the OR-gate 35, when either operating switch 23 or 24 is switched on. Thereby it is ensured that the motor is also periodically pulsed when the motor is blocked in the parking position. Still further, it must be ensured that the multivibrator 37 is reset when both operating switches 23 and 24 are switched off so that readiness for service can be achieved within a short time. This can be reached for instance via the lead 39 from the output of the OR-gate 31 via which the voltage supply for the multivibrator 37 is switched. Alternatively it would also be possible to energize the multivibrator 37 via a separate reset input.

FIG. 2a shows the voltage applied to the switching element 20. As long as the speed-dependent pulses are appearing at the output 17 of the limit switch 14 according to FIG. 2b the switching element remains connected through. According to FIG. 2c the inverting output of the multivibrator carries positive potential. The wiper motor is assumed to be blocked at the time $t_1$, so that speed-dependent pulses according to FIG. 2b are no longer generated. The multivibrator 37 is changed over after expiration of the cycle time $T_1$ of the monoflop 36, the initial voltage of which is shown in FIG. 2c. Thus for the cycle time $T_2$ of said multivibrator 37 the switching element 20 is energized. Thereafter the wiper motor is again connected to the source voltage 2 for the time $T_1$. At the time $t_2$ the trouble is assumed to be eliminated and the speed-dependent pulses are triggering the monoflop 36 before expiration of its natural cycle time, and the wiper motor remains continuously connected to the voltage source.

In the embodiment according to FIG. 1 the time interval of the speed-dependent pulses is compared to a reference signal, namely the natural cycle time of the monoflop 36. At the output of the multivibrator 37 a switching signal is derived as a result of this comparison which serves to control the switching element 20. The speed-dependent pulses produced by conventional limit switch 14 produce only one pulse during each wiping cycle. By correspondingly adjusting the cycle time of the monoflop 36 a switching signal can be generated only for the motor idle condition.

Figure 3:
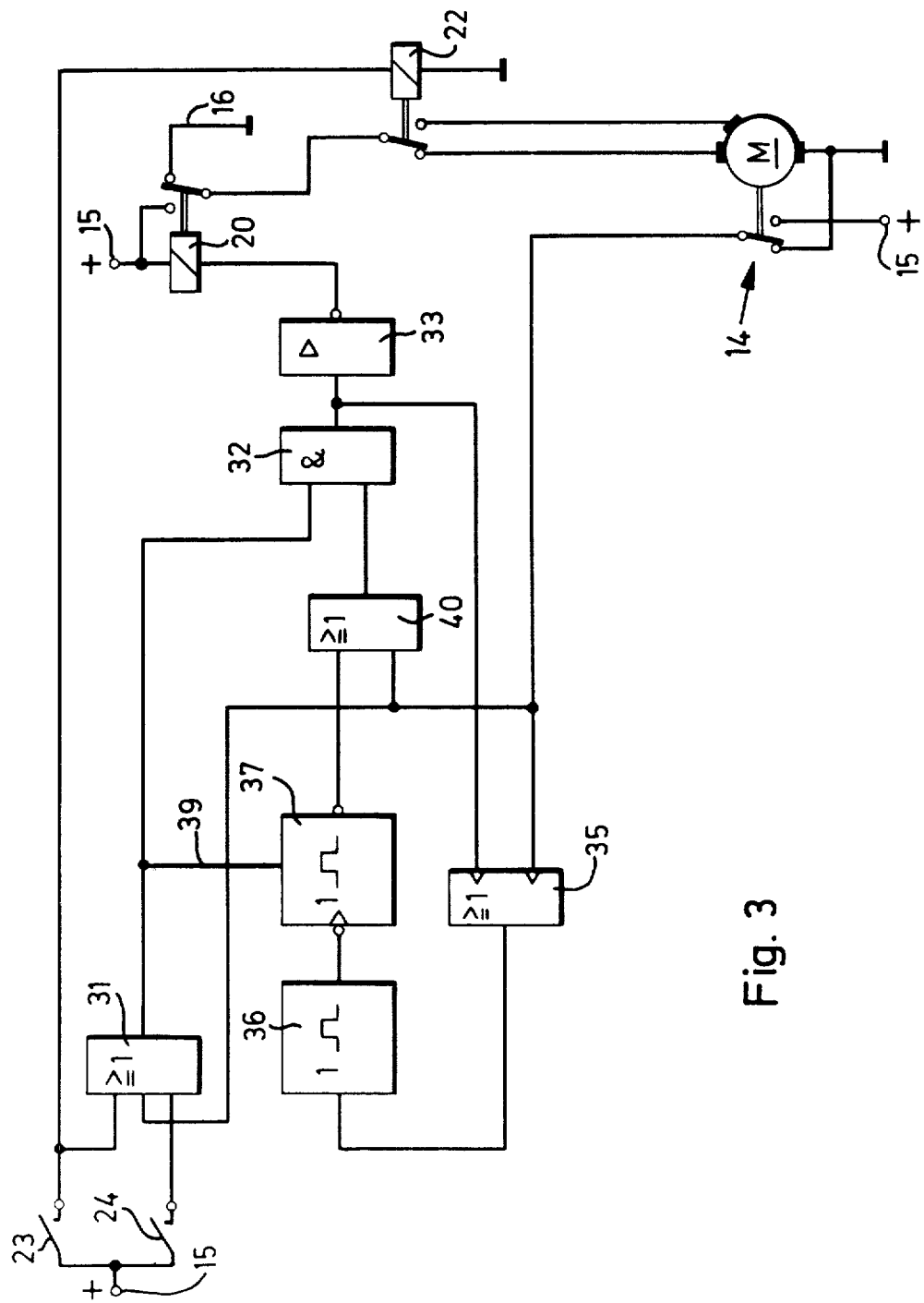
FIG. 3 is a schematic circuit diagram of an embodiment in which the switching signal is released, when the motor is tight (overloaded but not stalled) and the wiper blades are parked in the parking position.

The embodiment according to FIG. 3 differs from the circuit arrangement already described in a way that between the output of the monostable multivibrator 37 and the one input of the AND-gate 32 a further OR-gate 40 is inserted in the loop. The other input of 40 is directly energized by the limit switch 14. In this version the cycle time of the monoflop 36 is smaller, so that a switching signal is already released, when the wiper motor speed falls below a particular value. But via the OR-gate 40 it is ensured now that the overloaded motor is only definitely switched off in the parking position of the wipers. As long as the wipers are in other than the parking position, positive potential is switched on an input of the OR-gate 40 via the limit switch 14, so that the AND-gate 32 remains connected through as well, assuming that one of the operating switches 23 or 24 is closed.

Figure 4:
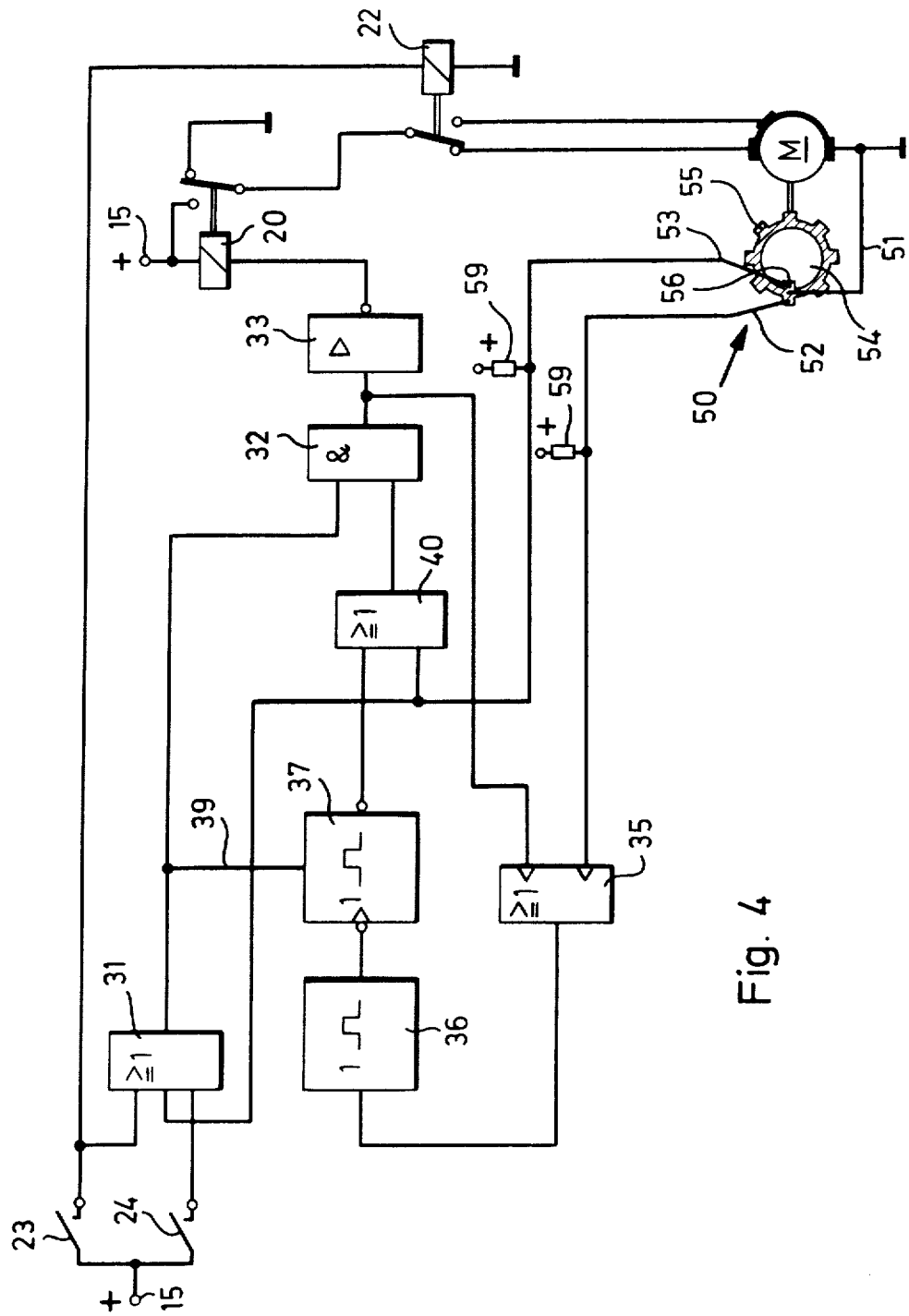
FIG. 4 is an embodiment analogous to FIG. 3 with a pulse generator having a higher pulse sequence rate.

In the embodiment according to FIG. 4 a plurality of speed-dependent pulses is released during each wiping cycle. For this purpose a switch 50 is provided having one contact 51 connected to earth and two stationary contacts 52 and 53. The first stationary contact 52 slides on a contact path of a switch wafer 54 having a plurality of contact segments 55. The contact 51 slides on continuous annular contact path which is connected to the contact segments 55 in an electrically conductive manner. The other stationary contact 53 slides on a third contact path with a single contact segment 56 which is also connected to the annular contact path. When the wiper motor is in operation the contact 51 is commutated to the first stationary contact 52 and in the parking position, additionally to the second stationary contact 53. Thus pulse sequences are extant at the stationary contacts 52 and 53, both of which are connected to the positive terminal 15 via resistors 59. Both signals are seen to be speed-dependent, however only the pulse sequence on the stationary contact 52 is used to trigger the monoflop 36, whereas the single pulse on the stationary contact 53 is used to bring the wiper motor to a standstill in the wiper end (parked) position. Of course the natural cycle time of the monoflop 36 is substantially shorter than a wiping cycle and thus this system has the advantage that the operating condition is interrogated and supervised at short intervals.

Figure 5:
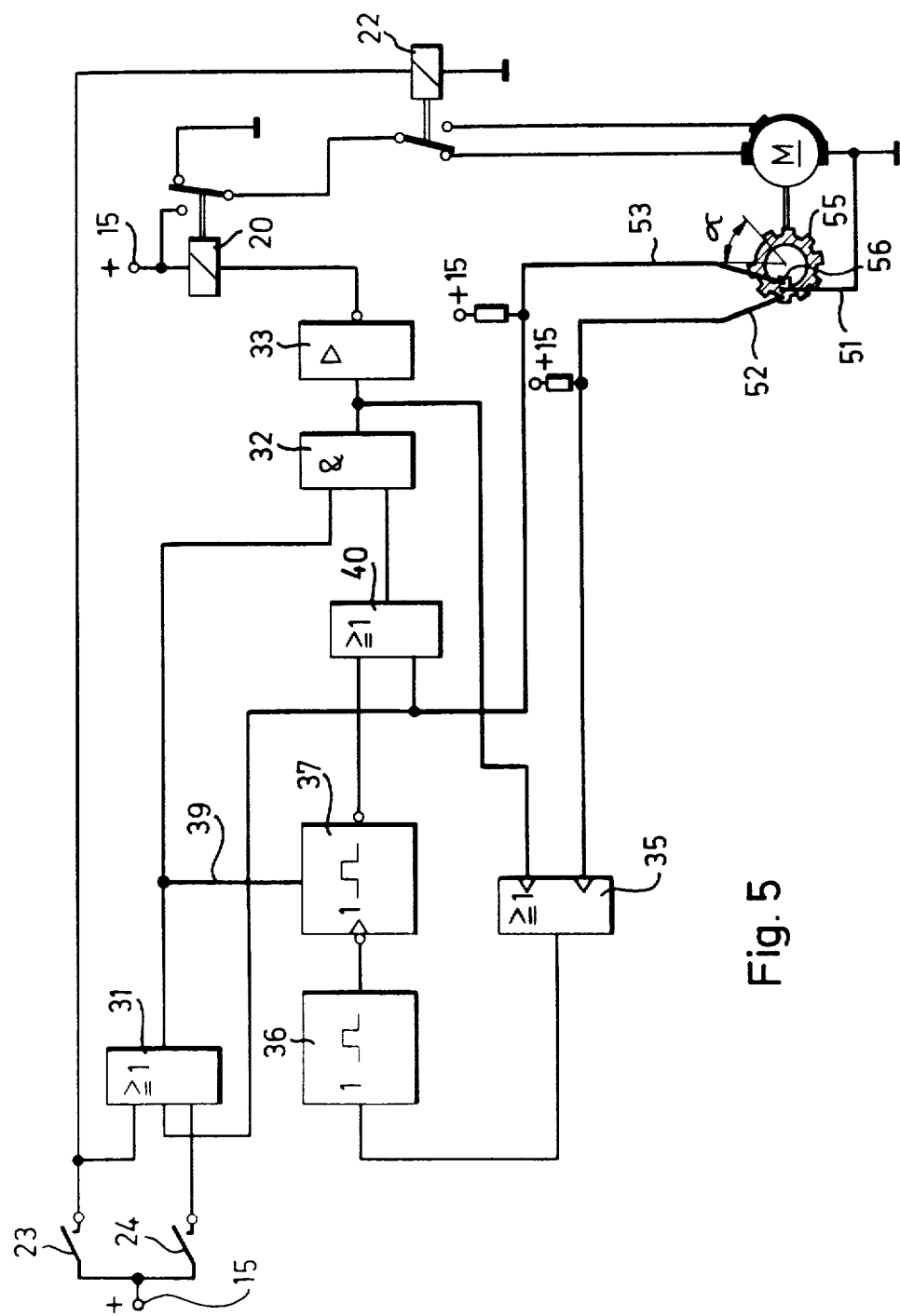
FIG. 5 is an embodiment analogous to FIG. 4 with discrete speed interrogation in a particular angular area.

In the embodiment according to FIG. 5, in an angular area α of about 30 degrees and that (measured from the parking position) in an angular area between 40 degrees to 70 degrees, no contact segments 55 are provided. Accordingly, in this angular area α no pulses appear on the stationary contact 52, and therefore in this embodiment the time interval of the pulses at constant motor speed depends on the position of the motor or of the wiper blades. The cycle time of the monoflop 36 is selected in such a way that at a particular degree of overload of the wiper apparatus the pulse sequence in the respective angular area is just sufficient to trigger the monoflop anew before its natural cycle time expires. But in the remaining angular areas the pulses are generated so rapidly one after another that a switching signal is only released at standstill of the wiper motor, but not when it is merely overloaded. Thus this embodiment shows that it is possible in particular angular areas to interrogate and evaluate a given criterion, but in the remaining angular area only to release the switching signal, only when the motor is idle.

Figure 6:
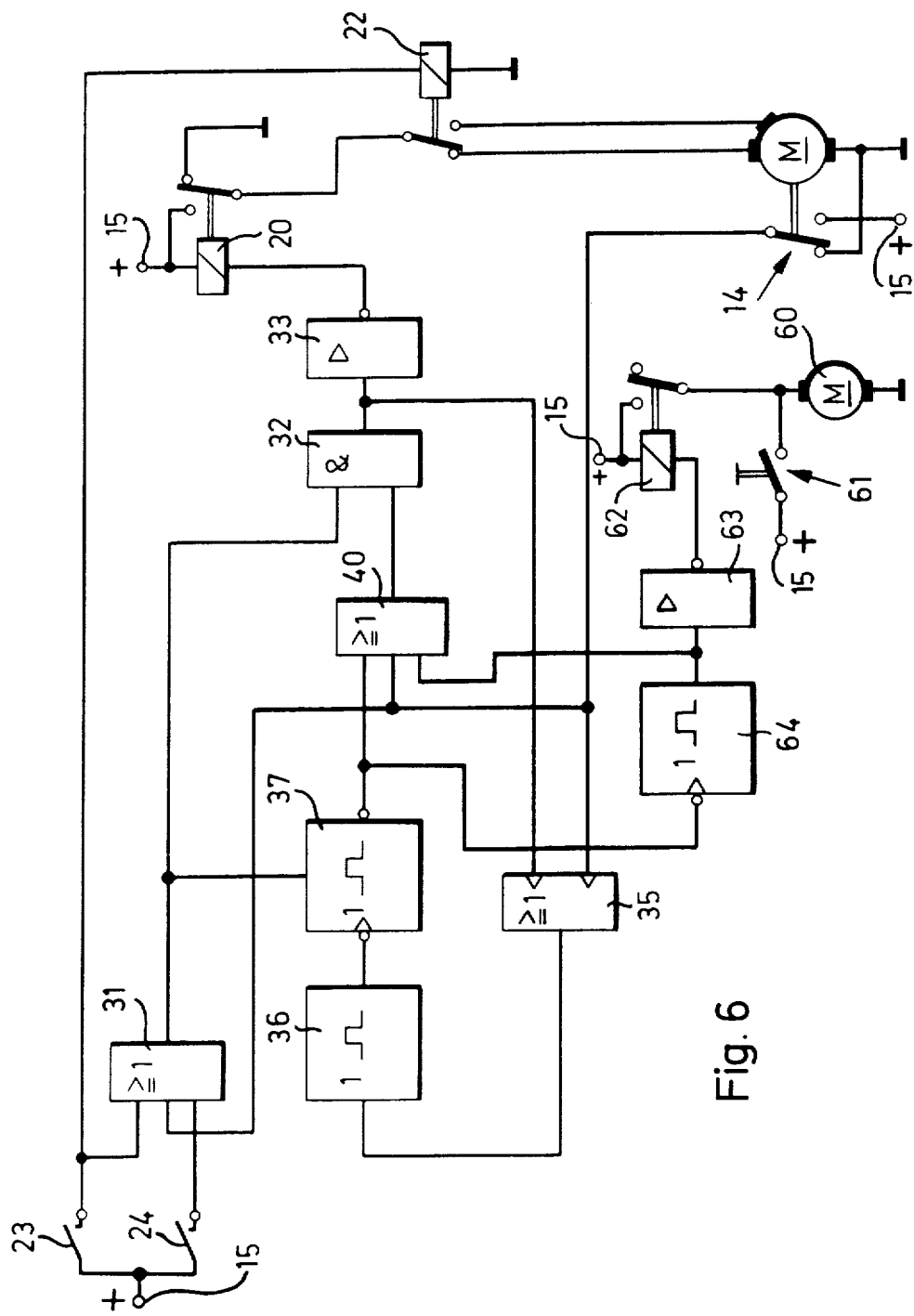
FIGS. 6 and 7 are embodiments in which the cause of the wiper motor overload or stall is eliminated by actuating the washing apparatus.

In FIG. 6 a washing pump motor is designated by 60 which may be energized via a washing key 61 or a relay 62. The relay 62 is switched by a monostable timing element 64 via an inverting amplifier 63. This timing element 64 is triggered by the output signal of the multivibrator 37 via the gates 40 and 32 and generates a control signal for the switching element 20 which is switched on a further input of the OR-gate 40. If, in this embodiment the wiper motor is running overloaded or is blocked and a switching signal is released at the output of the multivibrator 37, a momentary voltage is applied to the washing pump motor 60 via the timing element 64, the inverting amplifier 63 and the relay 62. Washing liquid is thus sprayed on the pane to be cleaned. Simultaneously the switching element 20 is energized for the natural cycle time of the timing element 64 via the OR-gate 40, the AND-gate 32 and the inverting amplifier 33. This process is periodically repeated until the wiper motor is no longer overloaded or blocked and returns to its parking position.

Figure 7:
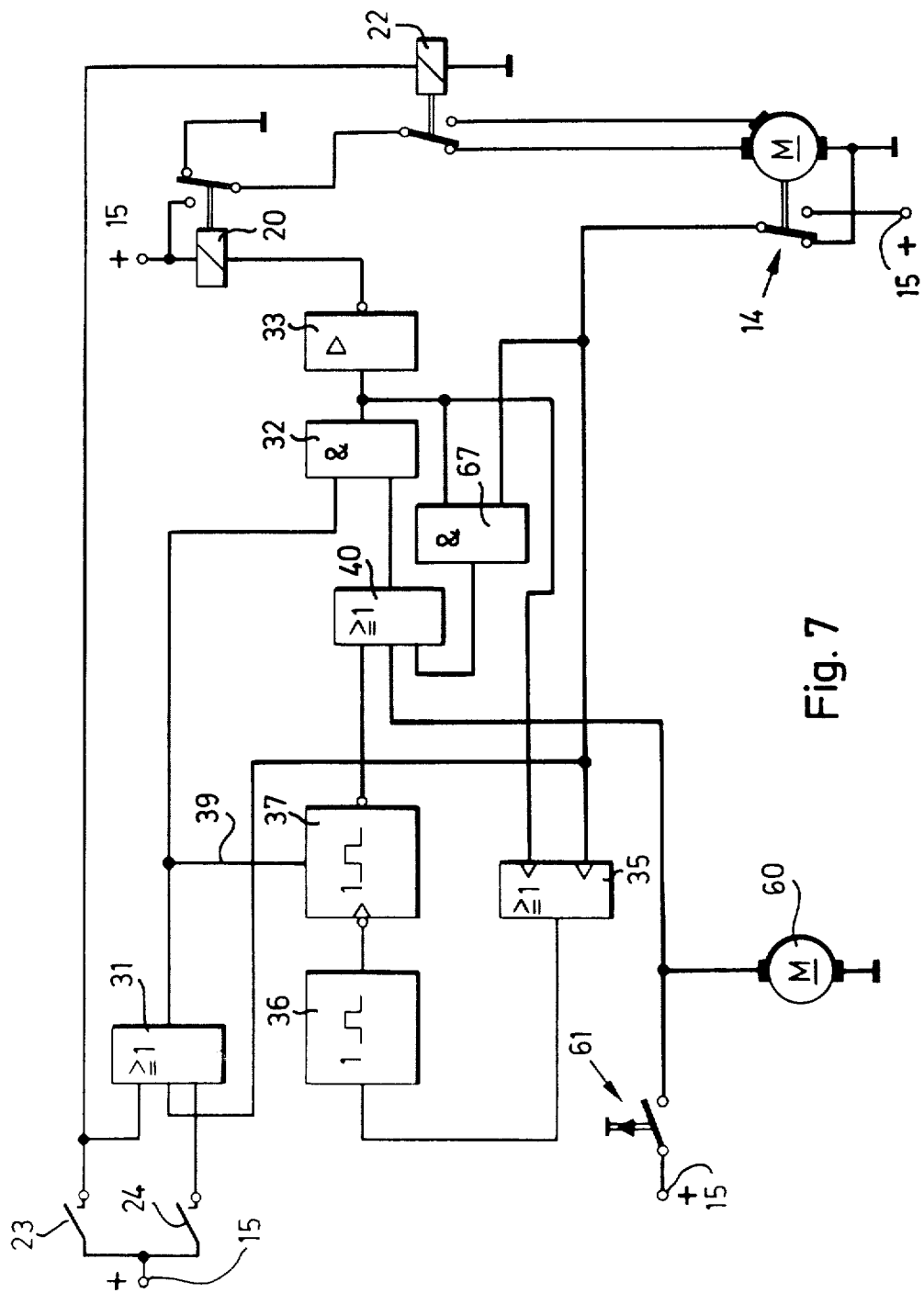

In contrast to the automatic control of the washing pump in the embodiment according to FIG. 6, the version according to FIG. 7 provides manual control of the washing pump 60 by means of the washing key 61. However, a control signal for the switching element 20 is thereby conducted to one input of the OR-gate 40. In this embodiment a selfholding circuit from the output of the AND-gate 32 to an input of the OR-gate 40 via a gate 67 is important, whereby said gate 67 is controlled by the limit switch 14. If the wiper apparatus is overloaded or blocked and the washing key is actuated, the switching element 20 is energized via the OR-gate 40, the AND-gate 32 and the inverting amplifier 33. The blocking or overloading of the motor is eliminated by the supply of washing liquid. If the washing key 61 is released before expiration of the natural period of the monostable multivibrator 37, the wiper motor is nevertheless moved into its parking position, because via the gate 67, a signal with the same effect as the control signal released by the washing key is fed back to the OR-gate 40 until the limit switch 14 changes over to earth.

Figure 8:
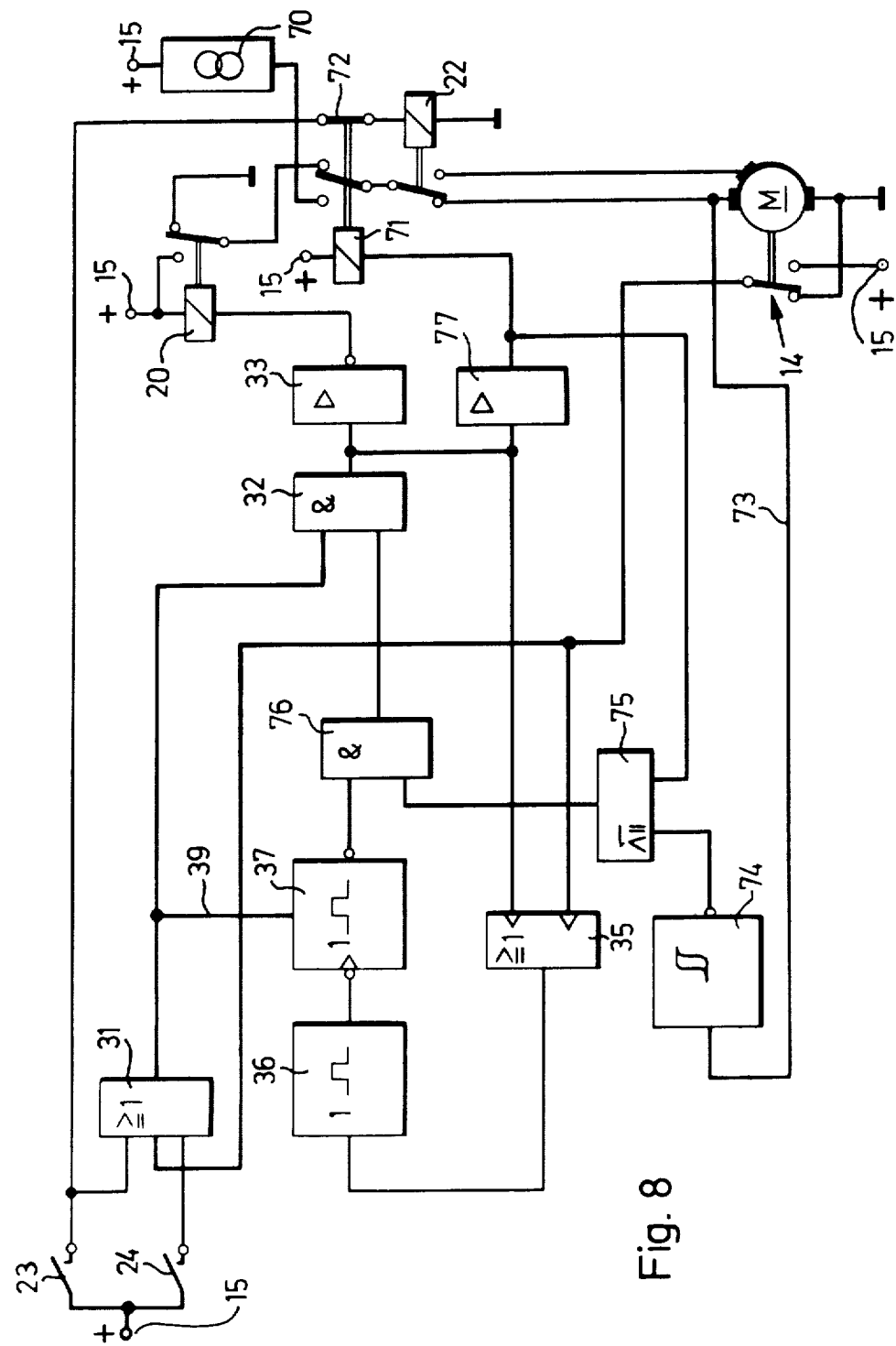
FIG. 8 is an embodiment in which speed and temperature are measured.

In the embodiment according to FIG. 8 a temperature-dependent protective circuit is also provided. A constant current source is designated by 70 from which a load independent current can be conducted to the armature winding of the wiper motor 10 via the changeover relay 71. Said changeover relay 71 has a further bridging contact 72 in series with the operating coil current of the speed changeover relay 22. When said changeover relay 71 is energized, the armature winding of the wiper motor is switched from the voltage source 15 and connected to the constant current source 70. In this switching condition the voltage extant at the armature winding is sampled via the lead 73 and conducted to a threshold value switch 74. At the output of the threshold value switch 74 normally positive potential may be measured, but if the temperature of the armature winding (and thus its resistance) is too high, the potential at the output of said threshold value switch jumps to earth. A gate 76 at the output of the multivibrator 37 is blocked via an OR-gate 75. Thus as long as the motor temperature is too high, the switching signal at the output of the monostable multivibrator 37 does not affect the switching condition of the switching element 20. The motor is then not connected directly to the voltage source, but only to the constant current source 70.

The changeover relay 71 indeed is only energized, when a switching signal is released by the monostable multivibrator 37 and switched onto the amplifier 77 via the gate 76 and the gate 32. Thus in this embodiment the speed of the wiper motor is interrogated and evaluated at first and only thereafter the system is changed over in such a way that the temperature-dependent switching stage becomes effective. Thereby the feedback from the output of the amplifier 77 to an input of the OR-gate 75 and to the gate 76 is of importance, so that the switching operation of the changeover relay 71 initiated by the switching signal of the monostable multivibrator 37 is also retained after expiration of the natural period of the monostable multivibrator 37 so long as the motor temperature exceeds a particular threshold value. If the motor however has cooled, the threshold value switch 74 changes over again and the changeover relay 71 is deenergized when the natural period of the multivibrator 37 has expired.

Figure 9:
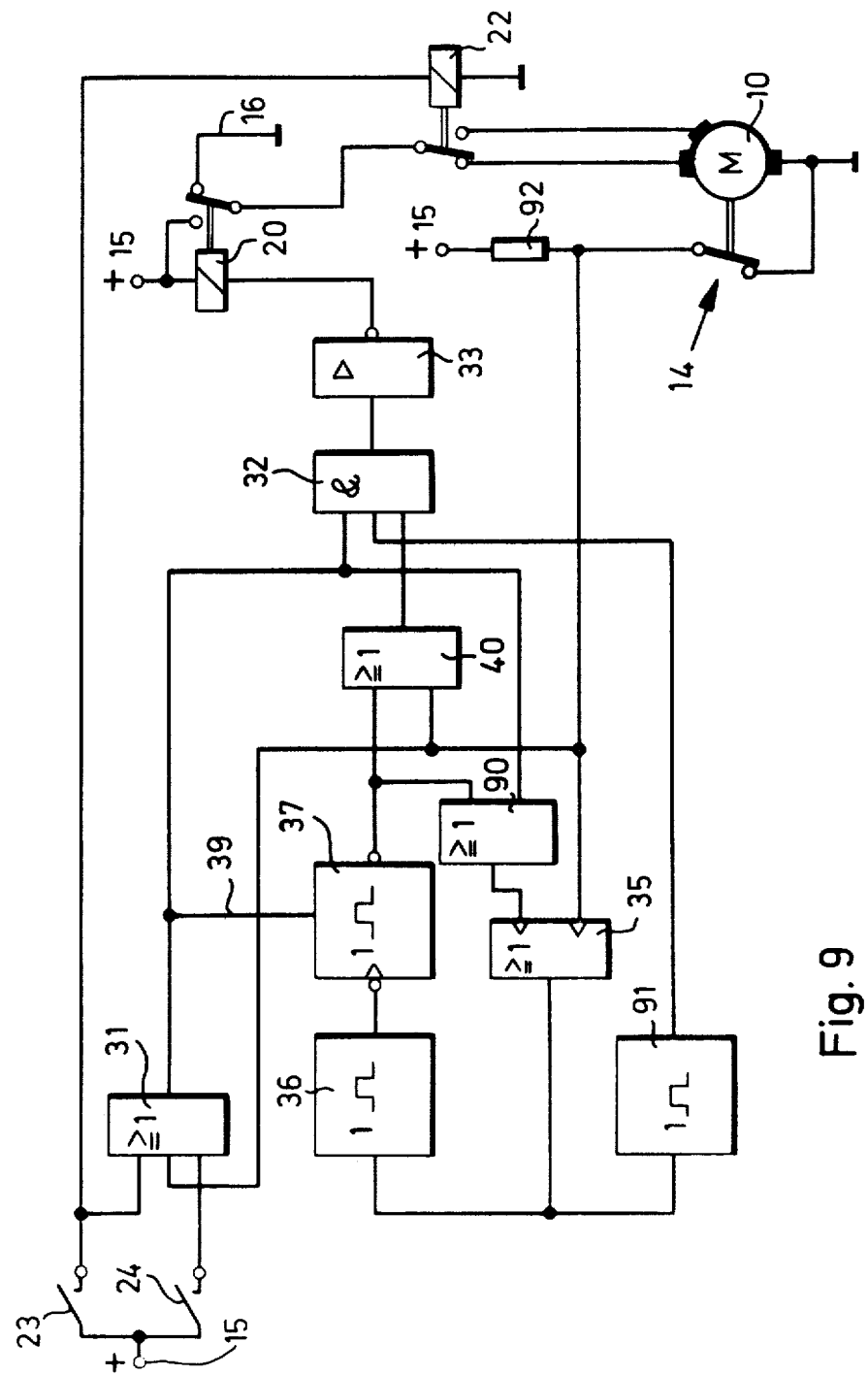
FIG. 9 is an embodiment with protection against blocking in the wiping area.

FIG. 9 shows an embodiment which is derived from FIG. 3, but additionally includes a protection against blocking within the wiping area. In the embodiment according to FIG. 3 the AND-gate 32 could energize the inverting amplifier 33 independently of the switching condition of the multivibrator 37 as long as the operating switch 23 or 24 was switched on and as long as the limit switch was not in its rest position. This is because both control inputs of the AND-gate 32 are applied to high potential via the OR-gates 31 and 40.

In the embodiment according to FIG. 9, an additional OR-gate 90 and a timing element 91 which may be retriggered are inserted, whereby a third input of the AND-gate 32 is controlled via the timing element 91. The OR-gate 90 has two inputs of which one is connected to the output of the monostable multivibrator 37 and the other to the output of the AND-gate 31 affected by the operating switches. The timing element 91 has a delay time of about 10 seconds, said delay time being longer than the time for a wiping cycle, even if the motor, due to a heavy load, rotates slowly. After this delay time the AND-gate 32 is triggered and thus the motor is reliably switched off. The OR-gate 90 serves for connecting a pulse through to the input of the timing element 91 via the OR-gate 35, when an operating switch 23 or 24 is switched on, so that said timing element is set and a starting of the motor 10 is ensured.

It is pointed out that this timing element 91 and the OR-gate 90 could also be used advantageously in the other embodiments. It is also shown in FIG. 9 that a resistor 92 is connected to the output of the limit switch 14 from a positive potential source so that a second contact on the limit switch is unnecessary. This variation can be applied in any of the other embodiments.

Thus a wiper motor can be effectively protected against destruction by overload with the embodiments described. It has to be pointed out that, one temperature-dependent switching stage is sufficient, in some cases the combination of a speed-dependent and a temperature-dependent protective circuit provide optimal safety. Of course the temperature-dependent switching stage could be energized by a temperature-dependent resistor independently of the armature winding. It is especially emphasized that individual features of the invention in connection with the temperature-dependent switching stage may be aspects of any arrangement according to the invention if a speed-dependent circuit is not used.

Finally it is pointed out that the control circuit as a whole can be produced as an integrated circuit, or can be integrated into a microcomputer system of a vehicle which additionally controls further functions in a motor vehicle. That means that an optimal discrete protective circuit is not necessary.

What is claimed is:

1. A control circuit for operating the motor of a windshield wiper from a parking position and through a given angular swing, said circuit comprising, in combination:

first means for producing a first signal during a portion of each wiping cycle of said motor;

means for generating a reference signal having a predetermined time duration;

means for comparing said first signal to said reference signal for providing an output signal when the duration between successive ones of said first signal exceeds the duration of said reference signal;

switch means responsive to said output signal for removing operating potential from said motor; and, means connected between the comparing means and said switch means and responsive to said first signal for applying said output signal to said switch means only when said wiper is in said parking position.

2. The control circuit according to claim 1, wherein said first means generates a plurality of signals only during a predetermined portion of each cycle which exceeds a given angular translation of said wiper.

* * * * *